United States Patent [19]

Kupcikevicius et al.

[11] 4,438,545
[45] Mar. 27, 1984

[54] STUFFING METHOD AND APPARATUS

[75] Inventors: Vytautas Kupcikevicius; Vytas A. Raudys, both of Chicago, Ill.

[73] Assignee: Union Carbide Corporation, Danbury, Conn.

[21] Appl. No.: 273,278

[22] Filed: Jun. 12, 1981

[51] Int. Cl.³ .............................................. A22C 11/00
[52] U.S. Cl. ........................................... 17/49; 17/34
[58] Field of Search ............................... 17/1 F, 49, 34

[56] References Cited

U.S. PATENT DOCUMENTS

| Re. 30,390 | 9/1980 | Kupcikevicius et al. | 17/49 |
| 3,748,690 | 7/1973 | Niedecker | 17/33 |
| 3,872,543 | 3/1975 | Niedecker | 17/33 |
| 4,007,761 | 2/1977 | Beckman | 138/103 |
| 4,202,075 | 5/1980 | Michel et al. | 17/41 |

FOREIGN PATENT DOCUMENTS 1786585 5/1974 Fed. Rep. of Germany .
1167377 10/1969 United Kingdom .

OTHER PUBLICATIONS

Preliminary Operating Instructions for "Poly-Clip" Machine FCA 3451.
TW Food Machinery Co. Product Bulletin Poly-Clip FCA Super.
Theory of Machines, 1939, Great Britain, Longmans Green & Co. Ltd., pp. 11, 12.

Primary Examiner—Willie G. Abercrombie
Attorney, Agent, or Firm—Dale Lynn Carlson

[57] ABSTRACT

Method and apparatus for stuffing food product into shirred casing in which a stuffing machine designed to stuff fully soaked casing is adapted to the use of controllably premoisturized casing. An internal sizing ring stretches the casing to about its recommended stuffed circumference so that the stuffing pressures required to fill the casing are reduced to manageable proportions. During the clipping cycle an increase in product pressure is avoided, by creating slack during the constricting phase of the gathering and clipping operation, and by gripping more tightly with the second tie gripper than with the first.

23 Claims, 14 Drawing Figures

STUFFING METHOD AND APPARATUS

This invention relates to stuffing of food product into shirred casing, and more particularly to a method and apparatus for utilizing controllably premoisturized casing.

Stuffing machines are known which automatically stuff food product, such as emulsion, into a casing length deshirred from a shirred supply, gather the end after the product is stuffed, apply a second tie clip, apply a first tie clip for a subsequent product, and then sever the product from the casing supply.

One such stuffing apparatus which has generally been well accepted, and which is capable of precisely controlling the stuffed diameter of the product is described and claimed in Kupcikevicius et al. U.S. Pat. Re. No. 30,390. In that apparatus, a sizing disc or ring is used to stretch the casing to about its recommended stuffed diameter just prior to filling the casing with emulsion. After the desired casing length is stuffed, a gathering and clipping operation is performed immediately adjacent the discharge end of the stuffing horn. A set of gathering gates constricts the casing following which a second tie clip is applied. In order to facilitate the gathering operation without causing an undesirable increase in stuffing pressure, a tension sleeve on the stuffing horn is reciprocated fore and aft to create a predetermined length of slack casing which can be drawn upon as the gathering gates constrict the sausage end. Because the gathering and second tie clipping is performed immediately adjacent the discharge end of the stuffing horn, the application of the first tie clip to the end of the casing supply must be performed in a later part of the cycle, after the clipper head is indexed to bring the first tie clipper into play. Such a sequential clipping cycle tends to extend the cycle length. This is not a serious drawback in the production of relatively large slicing size sausages, where careful application of the second tie clip is important, because a significant portion of the overall cycle is used in the actual stuffing operation. However, as the sausages become shorter in length and smaller in circumference, the clipping cycle becomes a more significant proportion of the overall stuffing cycle.

The casing which is commercially used in this stuffing system is controllably premoisturized by the casing manufacturer, and provides several advantages. First of all, there is no need to soak the casing stick at the processing plant immediately prior to stuffing. This yields a significant advantage with respect to convenience, in that the time, equipment and effort heretofore used in soaking the casing prior to stuffing is eliminated. Furthermore, with the moisture content of the casing being at a controlled level, the casing tends to behave in a predictable fashion on the stuffing machine. Finally, because prestuffing soaking is not a requirement, the casing can be shirred to higher pack ratios, so that a greater length of casing can be shirred into a stick of predetermined length, thereby reducing stuffing machine down time due to stick loading.

A second type of automatic stuffing machine, popular for at least some applications such as chubbing, is known as the Polyclip FCAS, and aspects thereof are generally described in Niedecker U.S. Pat. Nos. 3,748,690 and 3,872,543. The cycle time for the clipping cycle in this chubbing machine is reduced by applying the second tie clip to the stuffed product and the first tie clip to the casing end simultaneously. However, such simultaneous operation prevents the clipping mechanism from gathering the product immediately adjacent the stuffing horn. In practice, a pair of closely spaced gathering gates contact the stuffed product at about its fully stuffed circumference, constrict the stuffed product to gather the casing, then separate laterally to provide room for applying a pair of clips. During the course of constricting and lateral separation, some of the stuffed emulsion must be displaced. The machine can be configured to release the casing holdback force so that some of the emulsion can be displaced into slack casing drawn from the supply. However, in practice, during the separating portion of the clipping cycle, the gathering gate nearest the stuffed product allows the casing to slip therethrough, "milking" the emulsion into the stuffed product and increasing the internal product pressure.

While the reduced clipping cycle time is advantageous, particularly in chubbing applications where one desires to stuff a large number of relatively small size (say one pound) products, the chubbing machine possesses certain other disadvantages. The machine is not able to provide the size uniformity which can be achieved with the U.S. Pat. Re. No. 30,390 machine nor is it able to accommodate as large a range of casing sizes. In addition, as commercially applied, it requires the use of casing which is fully soaked prior to stuffing. As a result, the aforementioned advantages attributable to controllably premoisturized casing are not achieved.

Casing holdback force which opposes stuffing pressure to stretch the casing to size is produced on the chubbing machine solely by an external holdback device. While an external holdback device is convenient for easy release in creating slack, it is not particularly effective in use of controllably premoisturized casing because reliance is placed entirely on the meat mass entering the casing to stretch the casing to its recommended stuffed diameter.

More particularly, casing which is controllably premoisturized to a commercially acceptable level (for example about 20%) is much less pliable than fully soaked casing. As a result, stuffing pressures with premoisturized casing can be higher on the chubbing machine than those encountered with fully soaked casing by a factor of 2 or 3. This substantially increased stuffing pressure magnifies any problems with retention of clips on the product, problems which are particularly acute when stuffing short chubs.

It has been found that using an internal sizing disc or ring as described in Beckman U.S. Pat. No. 4,007,761 is a major advance in rendering such a stuffing machine compatible with premoisturized casing. It is believed that the ring stretches the casing toward or even beyond its elastic limit which causes the casing to take a temporary set. With the casing stretched to about its recommended stuffed circumference, the emulsion entering the casing need only fill the casing without accomplishing much, if any, additional stretching, resulting in a substantial reduction in stuffing pressure.

Unfortunately, disposing a sizing ring within the casing to stretch the casing to size on the chubbing machine, creates additional problems since the sizing ring establishes a holdback force which is unrelieved during the gathering and clipping operation. In the machine described in the aforementioned U.S. Pat. Re. No. 30,390, a slacking arrangement is provided in which a reciprocating pneumatic cylinder cycles a tension sleeve first fore, then aft, to create a controlled length of slack casing which, in effect, substantially reduces the holdback for that slack length. The slack casing is available to be drawn by the gathering gates in the gathering and clipping operation. The cycle time attributed to the gathering and second tie clip application in that apparatus is on the order of 1 to 2 seconds which allows the tension sleeve to be reciprocated by a double acting pneumatic cylinder which is first advanced, then retracted. A direct application of that approach to the simultaneous double clipper of the chubbing machine would have required an unacceptable extension of the approximately 0.7 sec. clipping cycle time.

In view of the foregoing, it is a general aim of the present invention to facilitate use of controllably premoisturized shirred casing on machines which operate like the aforementioned chubbing machine.

In accomplishing that aim, it is an object to effectively utilize a sizing ring to prestretch such casing before stuffing so as to reduce the required stuffing pressure.

An additional object is to accomplish the gathering and clipping operations without any significant increase in pressure within the stuffed product.

A more detailed object is to provide, in combination with a controllably premoisturized shirred casing supply and associated sizing ring, means for controllably creating a desired amount of slack casing without substantially extending the clipping cycle time.

Other objects and advantages will become apparent upon reference to the detailed description in conjunction with the drawings in which.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
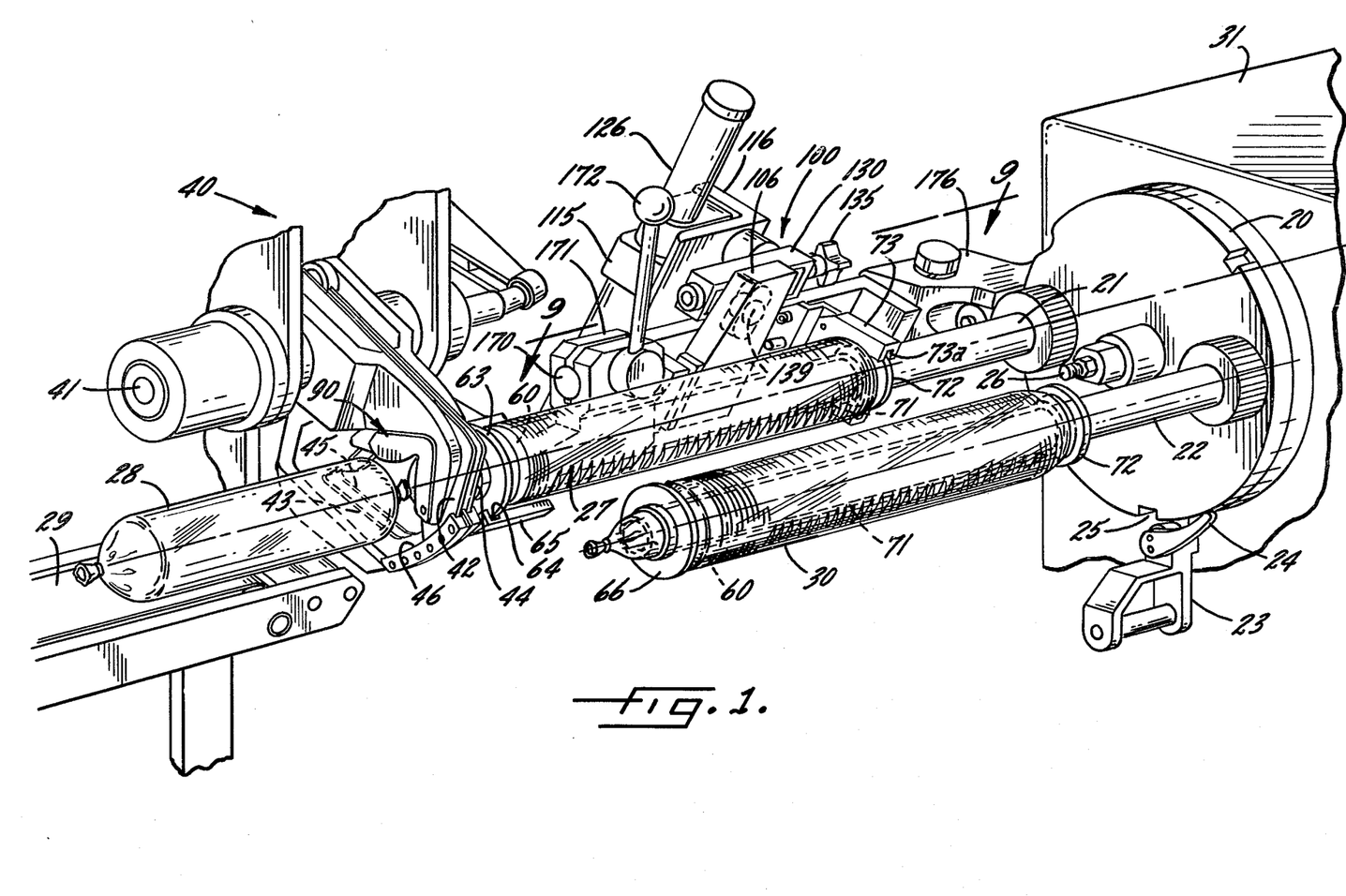
FIG. 1 is a perspective view of a portion of a chub stuffing machine modified in accordance with the present invention.

Turning now to the drawings, FIG. 1 shows a portion of the aforementioned FCAS stuffing machine modified in accordance with the invention to accommodate and reliably stuff controllably premoisturized casing. In its unmodified configuration, the stuffing machine includes a turret 20 having a pair of stuffing horns 21, 22 mounted thereon. Indexing means 23 are provided having a tang 24 for engaging notches in the turret, such as notch 25, for indexing the turret about a mounting post 26. In the illustrated condition, the stuffing horn 21 is in the operating position in which the casing supply 27 mounted thereon is ready to be stuffed with food product from a food pump schematically illustrated at 31 to produce stuffed and clipped sausages 28 which are carried away on a conveyor 29. A second casing supply 30 is mounted on the horn 22 and is ready to be indexed into the operative position after the casing supply 27 is expended.

Also as commercially supplied, the stuffing machine includes a gathering and clipping mechanism, a portion of which is illustrated at 40. The actual clipper has not been shown in order to avoid obscuring the invention; in practice, however, the clipping device does operate in conventional fashion to apply a second tie clip to the stuffed product and a first tie clip for the subsequent product, following which a knife is actuated to sever the encased product from the casing supply.

Referring in greater detail to the gathering mechanism 40, it is seen that two pair of cooperating generally V-shaped gripper jaws (sometimes known as spreader bars) are provided for pivoting about a common shaft 41. The second tie gripper, (the gripper closest to the stuffed product) includes an upper jaw 42 and a lower jaw 43, and the first tie gripper (the gripper nearest the casing stick) includes an upper jaw 44 and a lower jaw 45. In order to keep the paired jaws in alignment, each of the lower jaws provides a channel 46, 47 in which the upper jaw rides as the grippers pivot toward and away from each other.

Figure 5:
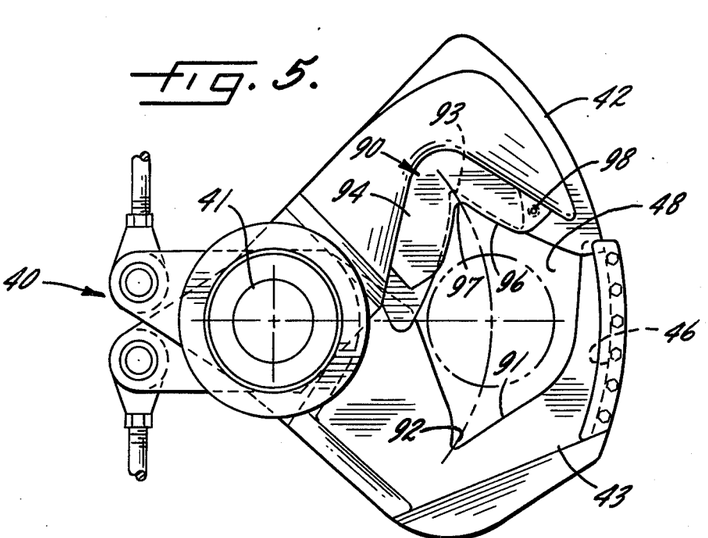
FIGS. 5 and 6 are elevational views illustrating the gathering mechanism in the open and closed positions respectively.
Figure 6:
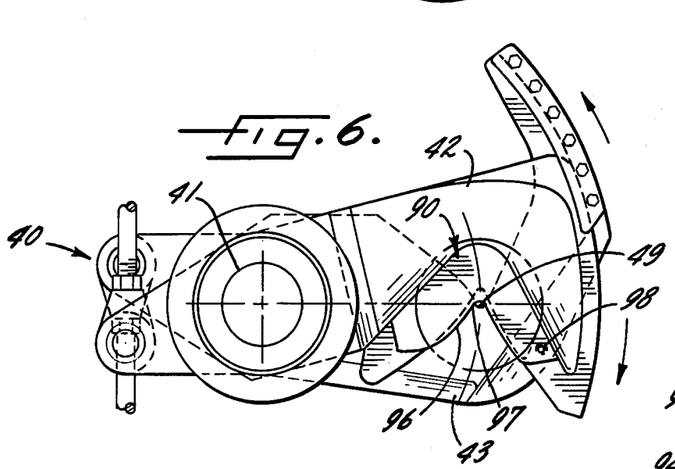
Figure 7:
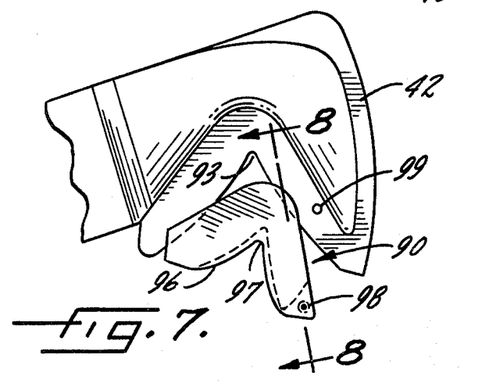
FIG. 7 is a partial elevation showing the installation of the gathering insert on its associated gathering gate.
Figure 8:
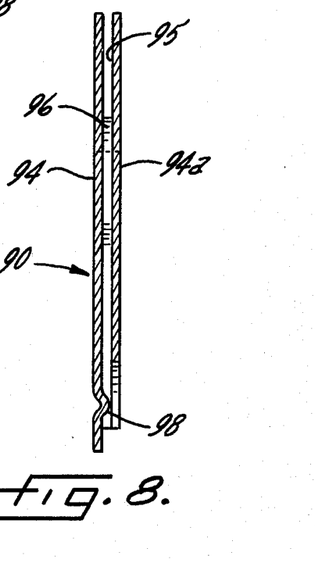
FIG. 8 is a partial sectional view of the insert taken along the line 8—8 of FIG. 7.

FIG. 5 illustrates the normal operating position for the gripper in which the upper jaws 42 (and 44 behind it) and the lower jaws 43 (and 45 behind it) are open, creating a substantial opening 48 through which a stuffed product can pass. When it is desired to gather and clip a product, the jaws are pivoted about shaft 41 by motive means (not shown) to assume the position illustrated in FIG. 6. It is seen that a very restricted opening 49 is created so that the casing within that opening is gathered and tightly gripped.

Figure 2:
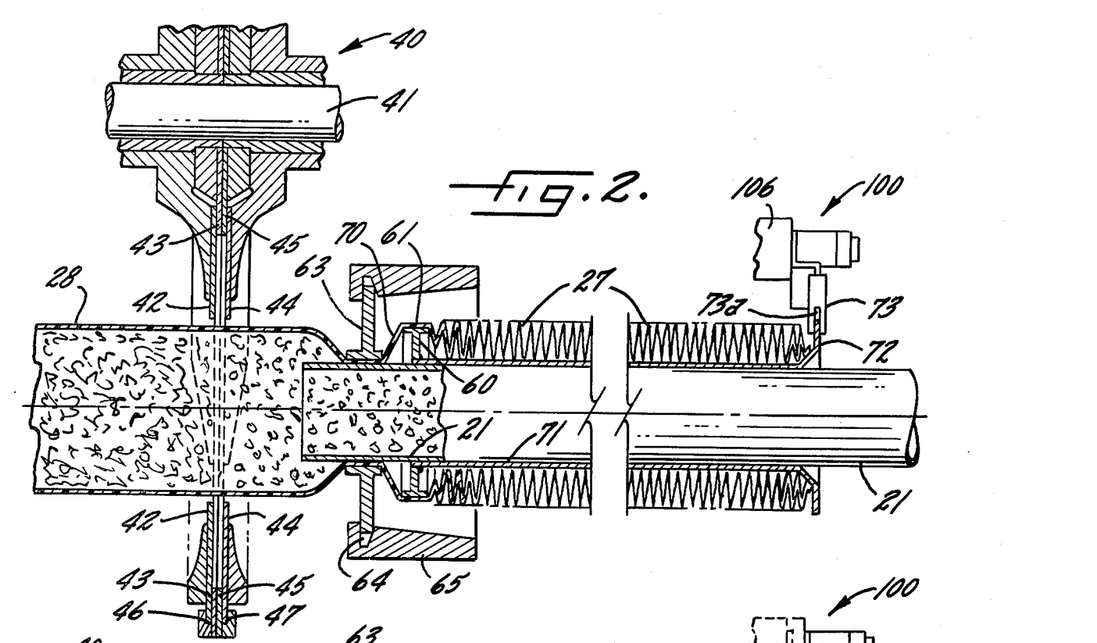
FIGS. 2-4 are fragmentary sectional views illustrating the constricting and separating operations of the gathering gates.
Figure 3:
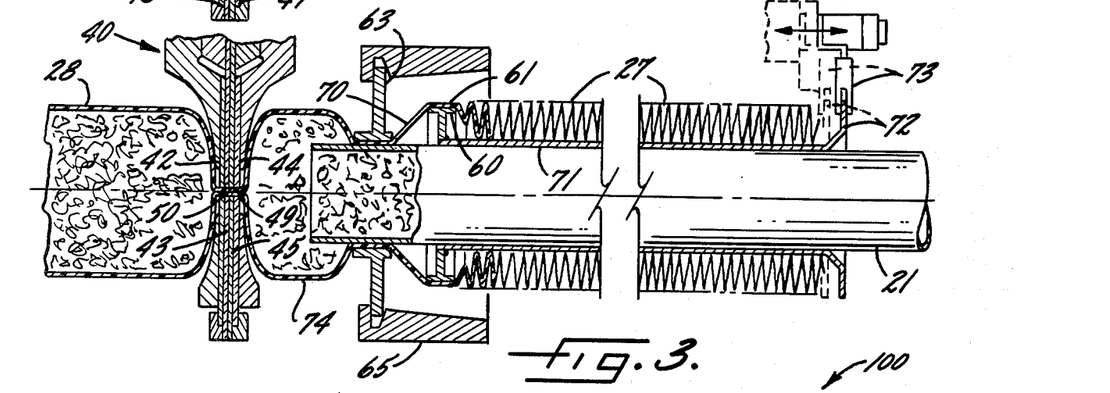
Figure 4:
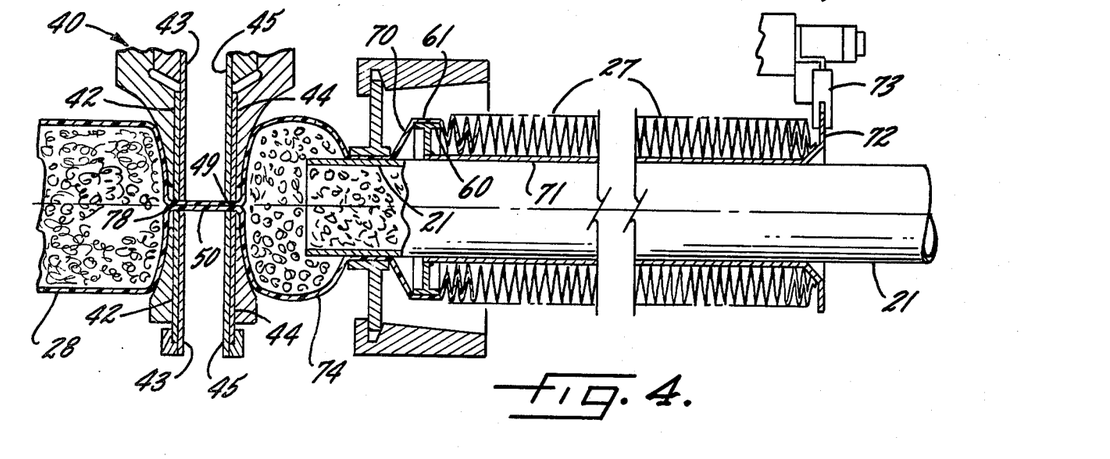

In addition to the constricting action, the jaws are adapted to separate laterally, that is, along the axis of the stuffing horn. FIG. 1 shows the normal operating position for the grippers in which a slight space is maintained therebetween. As the grippers begin to pivot toward each other to constrict and close the product, they are also translated toward each other to assume the juxtaposed relationship illustrated in FIG. 2. FIG. 2 is a plan view sectioned through the center line of the stuffing horn and stuffed product such that the blade members of the upper jaws 42, 44 are shown in section whereas the blade members of the lower jaws 43, 45, which are to the rear of the sectioning plane are shown in full lines. The jaws continue to pivot about the shaft 41 until they assume the fully closed position illustrated in FIG. 3 in which a section 50 of the casing is tightly held between both jaws in the constricted opening 49 described in connection with FIG. 6. After the casing is constricted, it is then necessary to separate the laterally movable jaws 42, 43 from the laterally stationary jaws 44, 45 to allow the clipper to be introduced to apply second tie and first tie clips and also to sever the casing tail 50. That condition is illustrated in FIG. 4 in which the still constricted grippers are now separated to allow entry of the clipper. After clipping and severing is complete, the jaws are again opened and returned to the FIG. 1 position and the cycle is repeated.

As commercially supplied, the chub stuffing machine includes an external holdback device such as shown, for example, in the aforementioned Niedecker patents, which serves to create a holdback force by gripping the casing as it passes over the stuffing horn. As is well known by those skilled in this art, increasing or decreasing the holdback force serves to increase or decrease respectively the stuffing pressure, and a particular holdback force is achieved which tends to produce a pressure which stuffs the product to the desired circumference. In prior commercial applications of this chub stuffing machine, fully soaked casing is used which is comparatively pliable. The external holdback device is adjusted to create sufficient stuffing pressure so that the meat mass entering the casing stretches the casing up to almost its normal stuffed circumference after which the casing gathering and spreader bar separating phase of the clipping cycle normally further increases product pressure to achieve final size. We have found that such an approach is unsuitable for using controllably premoisturized casing (say at about 20% moisture level) because the stuffing pressures required to cause the meat mass to stretch the casing to its intended stuffed circumference are so great that the pressures tend to blow the first tie clip from the casing end rather than deshir the casing and stuff the product. Alternatively, stuffing pressures can be reduced, but at the expense of understuffing the product.

Even when it is possible to stuff the product without rupturing the casing or blowing the first tie clip during stuffing, the gathering and separating operation tends to create further problems. More particularly, the V-shaped blades of the gathering gates are of identical shape such that in the gathered position the restricted opening 49 of the gates are equal. Thus, when the gates laterally separate (from the FIG. 3 to the FIG. 4 position) the second tie gate 42, 43 can slide on the casing, milking the product into the casing, increasing the stuffed pressure and either rupturing the casing or blowing the first tie clip.

We have found that it is possible to modify the chub stuffing machine in a way to be described in detail below in order to make it completely compatible with controllably premoisturized casing, without the danger of rupturing the casing or blowing of clips. First of all, in order to reduce stuffing pressures to manageable levels while still stuffing the product to the desired size, means are provided for prestretching the casing to about its recommended stuffed circumference prior to stuffing. To that end, each of the premoisturized casing supplies 27, 30 of FIG. 1 is provided with a sizing ring 60 having a circumference very near the desired stuffed circumference of the product, such that the casing as it deshirs and passes over the ring is stretched to about the desired size. We believe that the casing in so passing over the ring is stretched toward or even beyond its elastic limit so as to take a temporary set, which reduces stuffing pressure because the meat entering the casing needs to provide little if any additional casing stretching. Thus, stuffing pressures can be reduced to levels adequate to pull the casing over the ring and the casing can be filled while in its temporary set condition to the desired stuffed size without the need for excessive stuffing pressures.

Referring more particularly to FIG. 2, there is shown the ring 60 and a deshirred portion 61 of the casing passing thereover and being stretched to about the size of the encased product 28. FIG. 2 also shows an emulsion seal 63 through which the casing passes and which serves two functions. First of all, the seal 63 prevents backup of emulsion onto the horn. Secondly, as will be described in greater detail below, means are provided for controllably establishing the distance between the sizing ring 60 and the emulsion seal 63 so as to vary holdback force by means of varying the angle through which the casing must pass between the sizing ring and emulsion seal. As shown in FIG. 1, the emulsion seal rides in a flexible channel 64 in a holder 65 such that it is axially fixed with respect to the stuffing horn. It is seen that the spare casing supply 30 also has an emulsion seal 66 positioned in place by hand such that it will engage the channel 64 when the new stick is indexed into position. It is noted that the holder 65 is pivotably mounted about a shaft (not shown) such that indexing of the turret forces the holder 65 downward until the expended stick with emulsion seal clears the holder, whereupon the holder is spring loaded to return to its original position, being ready to receive the new emulsion seal 66 which is being pivoted into place.

Following the procedure described thus far, it is possible to stuff a desired amount of product into the casing at the desired stuffed pressure so that the casing is at its recommended stuffed circumference, and further increase in pressure is to be avoided. As described above, in the conventional use of the gathering and separating operation, it has not been possible to completely avoid product pressure increase during constricting and separating.

In accordance with the invention, means are provided for (a) creating slack casing which is available during the gathering phase of the cycle so that any product displaced during gathering is displaced into the slack casing rather than into the encased product where it would increase the stuffed pressure and (b) for performing the separating operation while assuring that the second tie gripper cannot slip on the casing, and all relative motion between the casing and the gripper takes place at the first tie gripper, thereby avoiding any increase in product pressure during separating. The manner in which that is accomplished will be described in connection with FIGS. 2-4.

Referring first to FIG. 2, there are shown the gathering gates in their proximate lateral position just prior to contact with the stuffed product. The sizing ring 60 is at a predetermined position with respect to the emulsion seal 63, and the casing section 70 therebetween is relatively taut. It is noted that the casing supply is not placed directly on the stuffing horn, but instead is disposed on a tension sleeve 71 which is slidably supported on the stuffing horn 21. The sleeve is flanged at 72 to be engaged by a holder 73 which can be reciprocated for moving the sleeve aft and then fore on the stuffing horn. FIG. 3 in full lines shows the aft position of the tension sleeve (with respect to its previous forward poition shown in dashed lines) and illustrates that the casing length 70 between the ring 60 and emulsion seal 63 is increased. The sleeve is moved quickly aft and then returned to the forward position as the constricting gates begin to engage the product and squeeze it down in going from the FIG. 2 to the FIG. 3 view. As a result, the increased portion of the casing length 70 between the ring and seal is available to receive product which is displaced by the constricting gates. FIG. 3 shows the completely constricted condition in which the displaced product has filled the intermediate casing length 74 between the gripper and emulsion seal, while little if any product has been forced into the encased product 28.

In order to assure that the pressure within the encased product 28 is not increased during the separating phase of the clipping cycle, that is in going from the FIG. 3 to the FIG. 4 condition, the second tie pair of gates 42, 43 are modified to produce a nip 78 therebetween which applies more force to the casing than the unmodified nip 49, thereby to assure that all of the casing movement with respect to the gathering gates takes place at the first tie gates 44, 45. Movement of the second tie gates 42, 43 away from the first tie gates 44, 45 simply carries the product to the left without increasing the pressure therein because the nip 78 is more tenacious than the unmodified nip 49. Since the tension sleeve position in FIG. 4 is the same as in FIG. 2 but a slacking cycle has been performed as shown in FIG. 3, the relatively taut casing portion 70 in FIG. 4 shows that the slack has been pulled through the emulsion seal to provide the casing tail 50 while still accommodating the product within the intermediate casing portion 74. When the cycle reaches the stage illustrated in FIG. 4, a conventional clipper is disposed between the gathering gates to apply first tie and second tie clips, and a knife is brought into play to sever the casing tail 50, whereupon the gates are opened and returned to the FIG. 2 position.

Turning now to FIGS. 5-8, there is shown the preferred manner in which the second tie gathering gate 42, 43 is modified to provide a more secure gripping action than its companion gate 44, 45. In accordance with the invention, an insert plate 90 having a shape similar to that of the gathering gate, but which restricts the nip size in the closed position is provided. Taking the gathering gate 43 as exemplary, it is seen that the jaw edge 91 is substantially V-shaped and that the junction 92 of the V is positioned to be juxtaposed to the similar junction 93 of the gate 42 in the closed position to create a restricted opening for gripping the casing. The gate insert 90 is formed of a pair of end members 94, 94a and has a generally V-shaped edge 96 which substantially conforms to the shape of the edge of jaw 42. Means are provided for joining the end members at the V-shaped edge 96 so as to form a channel. The joining is preferably accomplished by a welded seam which is ground and polished to provide a smooth surface for contacting the casing without damage. It is seen, however, that the junction 97 of the V-shaped edge 96 is not as deep as the corresponding junction 93 of the jaw 42 such that when the gates are pivoted to the closed FIG. 6 position, the nip therebetween is smaller than the corresponding nip of the first tie gates, to assure that the second tie gates grip the casing more tenaciously than the first tie gates.

As will be appreciated by those familiar with this chubbing machine, the gates move rather rapidly and reasonable forces are exerted during the gathering and separating operations. In that environment, it is noteworthy that the gate insert 90 can be frictionally engaged with the associated gate 42 without the need for additional fasteners or the like. More particularly, turning to FIG. 7, it is seen that the insert 90 is simply slid over the jaw of the gate 42. The channel 95 (FIG. 8) created between the end members 94, 94a is dimensioned to snugly receive the jaw 42, such that friction therebetween tends to hold the insert in position. In addition, the insert 90 is provided with a detent 98 which engages an aperture 99 in the jaw 42 so as to provide not only a locking feature, but also a positioning feature which assures that the insert is properly located.

It is therefore possible to modify the gathering mechanism of the chubbing machine in seconds to accommodate controllably premoisturized casing, and to remove the modification in a few additional seconds if it is desired to use the machine with soaked casing. In addition, it has been found that, by means of the friction fit and detent lock, the insert can be mounted into the desired position without danger of coming loose during operation. If desired, the friction fit can be enhanced by making one of the end members 94, 94a somewhat resilient, and slightly reducing the size of the channel 95, so as to cause the insert to grip the jaw more tightly.

As noted previously, and in practicing the invention, in order to assist the modified gripper in avoiding pressure buildup in the stuffed product, means are provided for controllably creating a predetermined amount of slack casing which can be drawn upon by the gripper so that any product displaced during the clipping cycle is displaced into the slack casing which was provided rather than forced into the encased product. While various forms of slacking devices can be used, it is preferred to provide a slacker mechanism which cycles more quickly than certain prior slackers so that the clipping cycle need not be delayed or lengthened.

Referring again to FIG. 1, it is seen that the shirred casing supplies 27, 30 are not mounted directly on the respective stuffing horns 21, 22, but instead are disposed upon respective tension sleeves 71, which are slidable on the stuffing horns. Referring particularly to the casing supply in the operative position, it is seen that the sleeve 71 has a flange 72 which fits within a channel 73a in its sleeve engaging bracket 73. The bracket 73 in turn is quickly reciprocated by a slacking mechanism generally indicated at 100 in a manner now to be described.

The illustrated chub stuffing machine as commercially supplied has a clipping cycle time of only about 0.7 seconds. The first phase of the cycle is the constricting or gathering operation, and that is completed (to the state shown in FIG. 3) in about 0.16 seconds. As an absolute limit, the slacker must be capable of creating slack before constricting is completed in order to provide room to take the displaced emulsion and prevent a pressure increase in the stuffed product. In order to assure that slack is available to accommodate displaced product, we prefer to delay the initiation of the clipping cycle until slacking is accomplished; in addition, we prefer to accomplish slacking as quickly as possible so that the delay is relatively imperceptible. Using a pneumatic cylinder which must be both advanced and retracted to complete a slacking cycle would not be a practical solution capable of achieving the desired operating speed. However, using the slacker now to be described, the delay can be limited to a relatively insignificant 0.1 seconds.

Figure 9:
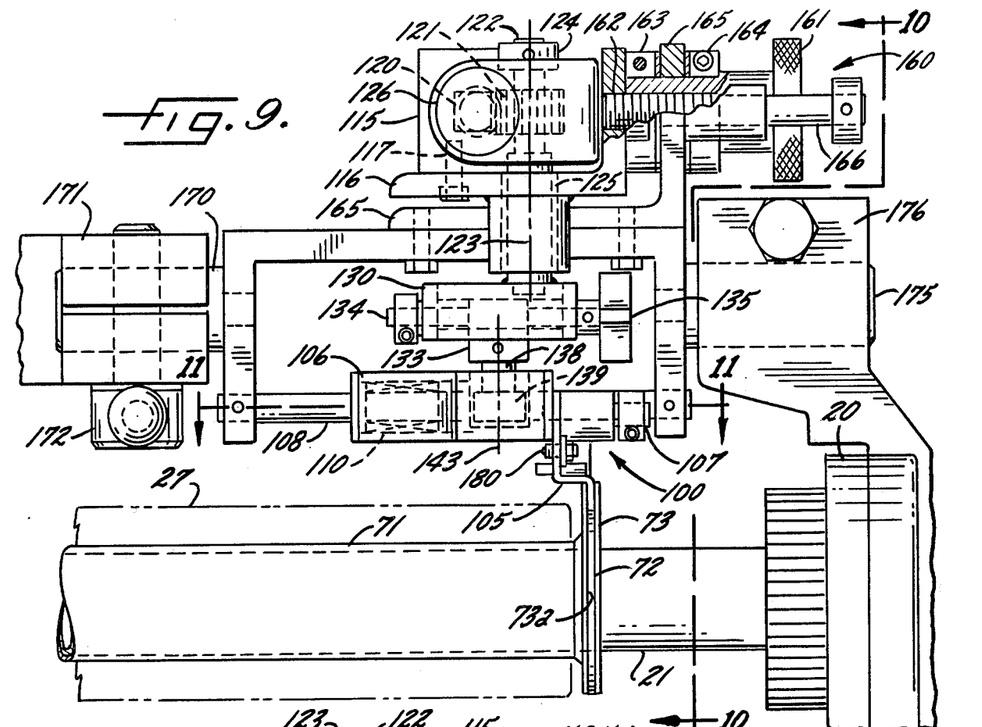
FIG. 9 is a plan view of the slacking mechanism taken along the line 9—9 of FIG. 1.
Figure 10:
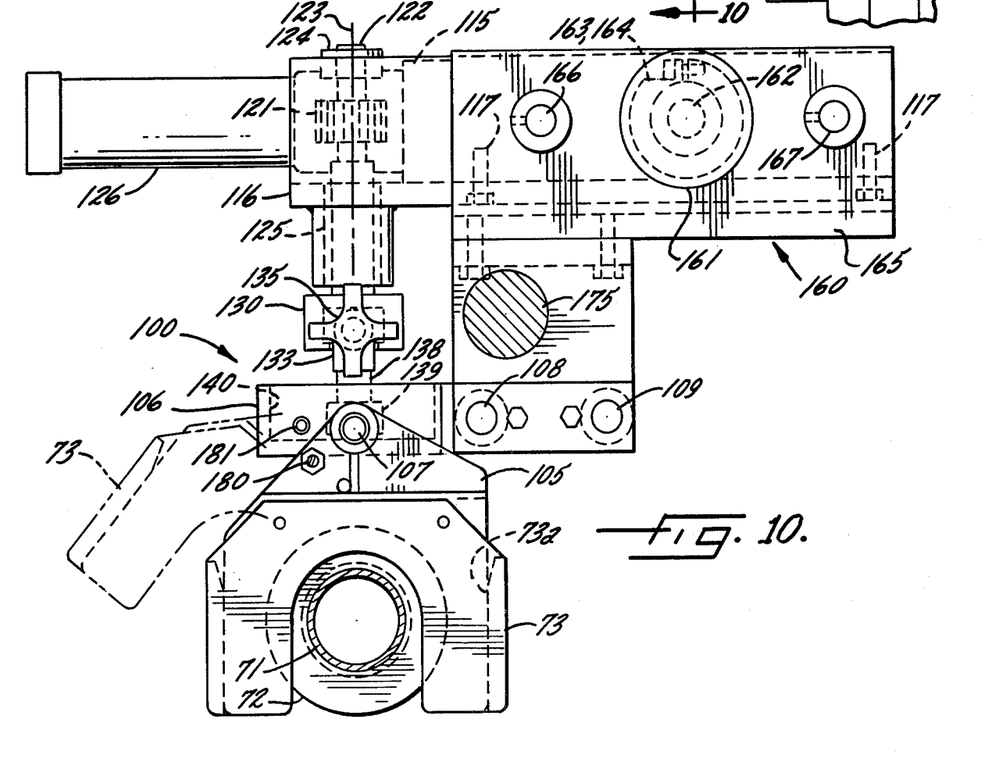
FIG. 10 is an elevational view of the slacking mechanism taken along the line 10—10 of FIG. 9.
Figure 11:
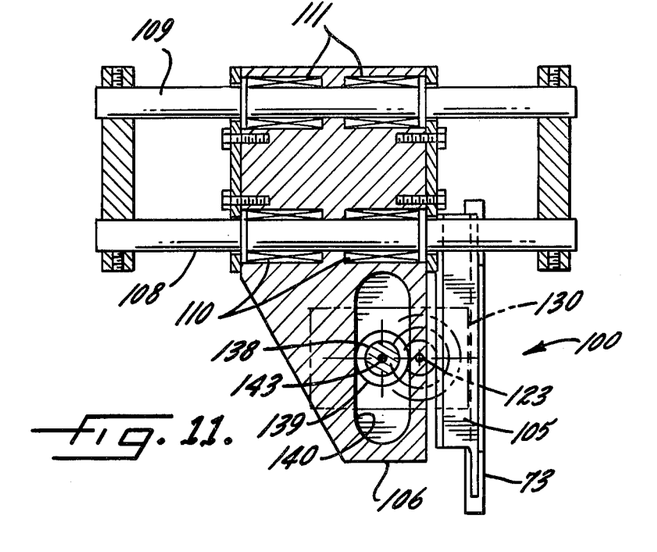
FIG. 11 is a partial sectional view showing the translating elements of the slacker taken along the line 11—11 of FIG. 9.

In practicing this aspect of the invention, a slacker is provided which creates a full reciprocation of the tension sleeve with a single linear throw of the actuating mechanism. As best shown in FIGS. 9-11, the sleeve engaging bracket 73 is mounted on an actuator arm 105 which in turn is affixed to a sliding block 106 mounted for reciprocation on a pair of guide rods 108, 109. The block 106 is fitted with ball bushings 110, 111 which facilitate its travel in a direction parallel to the axis of the stuffing horn.

In keeping with the invention, the sliding block 106 is reciprocated by a linear to rotary to linear actuator in such a way that a full reciprocation is accomplished by a single stroke of the linear actuator. A linear actuator, shown herein as a pneumatic cylinder 115 is secured to a base plate 116 as by bolts 117. Affixed to the operating rod of this cylinder is a gear rack 120 which engages a pinion 121 mounted on a shaft 122 disposed for rotation about an axis 123 in bearings 124, 125. A protective cover 126 provides sufficient clearance for a full advance stroke of the piston within the cylinder 115. The piston stroke and gear ratios are arranged such that a full stroke of the cylinder causes a 360° rotation of the pinion 121.

The shaft 122 is affixed as by welding to a stroke adjusting block 130, such that rotation of the pinion causes the block 130 to rotate about the axis 123 of the shaft 122. A T slot nut 133 is held in a track in the block 130 and engages a stationary lead screw 134 having an adjusting knob 135 secured to one end thereof. Rotation of the knob 135 serves to advance the T slot nut either to the left or to the right as shown in FIG. 9, depending on the direction of rotation.

The T slot nut 133 is affixed to a further shaft 138 which carries a cam follower 139. The cam follower, in turn, is engaged in an elongated slot 140 in the sliding block 106. As best shown in FIG. 11, the slot 140 is perpendicular to the axial direction of travel of the sliding block 106. The shaft 138 with attached cam follower 139 create an axis 143 which, by adjustment of the stroke adjusting screw 135 can be displaced from the axis 123 of rotation of the shaft 122. Accordingly, when the pneumatic cylinder 115 is actuated from either the retarded to the advanced or advanced to the retarded position, the resulting 360° rotation of the shaft 122 by means of pinion 121 causes a corresponding 360° rotation of the complete stroke adjusting block 130 and, by means of the cam follower 139 riding in the slot 140, a reciprocation of the sliding block 106.

Figure 12A:
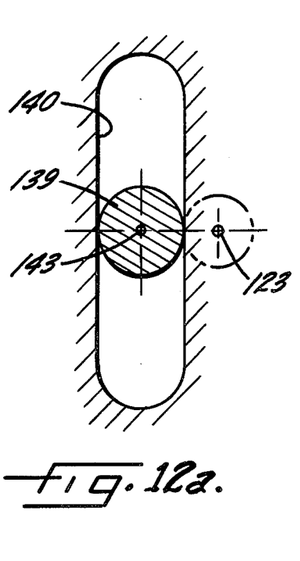
FIGS. 12a-12c are diagrams illustrating the motion of the translating elements of FIG. 11.
Figure 12B:
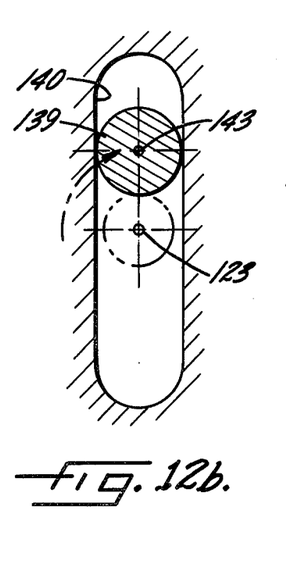
Figure 12C:
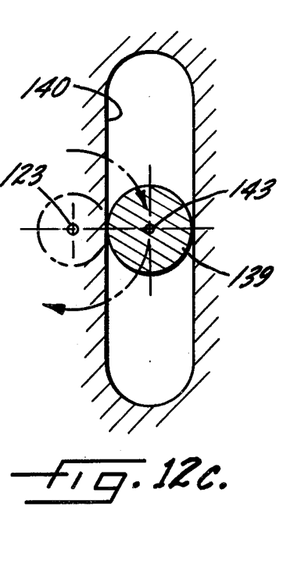

The manner in which that occurs will be more readily appreciated with reference to the schematic diagrams of FIGS. 12a-12c. There is illustrated the fixed axis of rotation 123 of the driving shaft 122 and the additional axis 143 of the cam follower 139. FIG. 12a illustrates the normal operating position of the apparatus in which the tension sleeve is in its forward position. When it is desired to create slack, the shaft 122 is rotated through 360°. Since the axis 143 is at a known distance from the axis 123 as established by the setting of the adjusting knob 135, the rotation of the stroke adjusting block 130 about axis 123 causes the axis 143 to move in a circle about the axis 123. By means of the guide rods 108, 109 constraining the sliding block to only axial motion, any radial component of motion will be taken up by movement of the cam follower 139 within the slot, while the axial component of motion will be fully utilized by drawing the block to the rear, then returning it to the fore.

FIG. 12b shows the relative position of the elements after 90° of rotation; the cam follower 139 is moved laterally within the slot 140, but also translates the entire sliding block to the rear. FIG. 12c illustrates the elements after 180° of rotation, showing the slot and the block which carries it have been translated to the rearmost position. Rotation continues with the cam follower then moving down in the slot as the slotted block is carried forward until the apparatus returns to the FIG. 12a position. Since the sleeve engaging bracket 73 is attached to the slotted sliding block 106, the tension sleeve 71 is carried first aft, then returned forward, as previously described schematically in connection with FIGS. 2-4.

It will now be apparent that each linear stroke of the pneumatic actuator 115 will cause a full cycle, although the direction of rotation will reverse for advance and retard actuations of the cylinder. Using only a single stroke of the cylinder, it has been found that slack can be created within the limited operating time available, without the need for delaying the clipping cycle of the chub stuffer by more than the 0.1 seconds previously mentioned.

As a means of adjusting the amount of slack which is to be created, operation of the stroke adjustment knob 135 serves to adjust the length of the stroke of the slacker, by displacing the axis 143 from the axis 123 to either increase the stroke as the distance is increased or decrease the stroke as the distance is decreased. This provides a precise control over the stroke length of the slacker which translates into precise control over the length of slack casing which is created, thereby rendering the system adaptable to a wide range of stuffing requirements.

It is seen that the sleeve engaging bracket 73 by means of the actuating arm 105 is pivotably mounted on the sliding block 106 so as to be rotatable about a shaft 107. As a result, the bracket can be pivoted out of the way during the indexing of the turret assembly when it is desired to replace an expended casing stick. A ball plunger 180 on the actuator arm 105 and a ball button 181 in the sliding block cooperate to position the sleeve engaging bracket 73 in the proper position to receive the flange 72 of a new casing stick as it is indexed into position.

It was previously noted that stuffing pressure adjustment was available by altering the distance between the emulsion seal 63 and the sizing ring 60 which is mounted on the tension sleeve. To that end, a holdback force adjustment assembly 160 is provided as shown in FIGS. 9 and 10. The adjustment includes an operating knob 161 mounted on a threaded rod 162 which is secured by means of a pair of collars 163, 164 in a stationary base plate 165. The stationary base plate includes a pair of guide rods 166, 167 upon which is mounted the movable base plate 116. The threaded rod 162 is fixed to the movable base plate 116 as by welding. Accordingly, rotation of the knob 161 causes the threaded rod 162 to move in or out with respect to the stationary base plate 165, carrying the movable base plate 116 along with it. Since the sleeve engaging bracket 73 is secured by the mechanism previously described to the movable base plate, the tension sleeve is carried either toward or away from the emulsion seal 63, thereby adjusting the position of the sizing ring 60 with respect to the emulsion seal 63.

In the chub stuffer as commercially supplied, attachment between the turret mechanism 20 (FIG. 1) and the remainder of the chub stuffer including the clipping and gathering mechanism 40 is accomplished by means of a connecting rod to which the respective elements are clamped. In making the present system adaptable for simple modification of such machine, the connecting rod is replaced by the slacker mechanism 100 which in addition to providing slack as just described serves as means for attaching the turret assembly to the stuffing machine. To that end, the slacker mechanism carries a mounting stub 170 which is secured in a clamp 171 by operation of a clamp tightening arm 172, thereby to attach the left end of the slacker mechanism to the stuffing machine. Similarly, the opposite end of the slacker assembly carries another mounting stub 175 which is secured in a second clamp 176 to the turret head assembly of the machine. As a result, it is a relatively simple operation to install the slacking mechanism when it is desired to stuff controllably premoisturized casing.

Due in part to the ease of mounting which is provided, a slacking mechanism and a gripper insert can be supplied in kit form for installation in the field. In addition it is a simple matter to use a modified machine with both fully soaked and controllably premoisturized casing as desired. The system configuration for use of premoisturized casing has been described above. If it is desired to switch to fully soaked casing, it is only necessary to (1) deactivate the slacker by a simple on/off switch and swing the holder 73 to an inoperative position, (2) remove the gripper insert 90 from the associated gripper jaw, and (3) reinstall the conventional external holdback device. Since the emulsion seal 63 rides in the carrier 65 which normally holds the external holdback device, the latter is slipped over the casing stick and indexed into operative position by the turret as in conventional use of the machine.

A preferred embodiment of the present invention has been described and is suitable for use with many types of shirred casing which can be mounted on a tension sleeve. With respect to the casing aspect, additional benefit can be gained by utilizing the invention described and claimed in concurrently filed Beckman et al. U.S. application Ser. No. 261,304 assigned to the same assignee as this application. That application describes and claims a casing article in which the shirred casing is compressed in place on the tension sleeve and the sizing ring is then fixed in position on the end of the sleeve. The casing end is then clipped closed so as to be immediately ready for stuffing when the sleeve is slid on the horn and indexed into position. Utilizing the compressed in place casing provides additional advantages including increasing the amount of casing supply which can be shirred into a stick having a length compatible with the stuffing horn.

Embodiments of this invention other than those described hereinabove, but within the spirit and scope of the invention, may, in the light of this disclosure, occur to persons familiar with the art. For example, the insert plate 90 has been described as a simple and effective means for providing a more secure gripping action in the second tie gathering gate 42, 43 than is provided in the first tie gathering gate 44, 45. This may also be achieved without the use of an insert by providing a change in the jaw surface 91 of at least one of the jaws. This can be easily accomplished by providing the second tie gate with at least one jaw which has an apex at the V which is less deep than the corresponding apex at the V of each of the jaws in the first tie gate which, in the described embodiment, operates to effect less than full constriction of the casing. Alternatively, all four jaws within the two gates could have the same shape with the same V depth. In such an embodiment the more secure gripping action may be achieved in the second tie gate by positioning the upper jaw so that its leading edge is closer to the lower jaw than is the case in the first tie gate. Then when the gates are closed, the jaws of the second tie gate will grip the casing tighter than the jaws of the first tie gate and effect substantially full constriction of the casing.

In summary then, the embodiments disclosed in the foregoing description of the invention are to be construed as illustrative only, and not in any limiting sense. The invention has been properly defined and limited by the appended claims.

We claim as our invention:

1. A method of stuffing a flowable product into casing lengths deshirred from a shirred casing supply having a closed first tie end comprising the steps of:
   a. stuffing a desired amount of the product into the casing supply while applying a holdback force to the casing to achieve a desired stuffed pressure;
   b. constricting the encased product with closely spaced first tie and second tie gates to close the second tie end of the encased product;
   c. prior to completion of the constricting step creating slack in the casing supply so that the stuffed product displaced during constricting is forced into the slack casing and the encased product pressure is not substantially increased;
   d. separating the first tie and second tie constricting gates while gripping the casing more tightly with the second tie gate than with the first tie gate so that the product displaced during separating is displaced into the slack casing and the encased product pressure is not substantially increased; and
   e. applying second tie and first tie clips, severing the casing therebetween and releasing the gates.

2. In a method of stuffing a flowable product into casing lengths deshirred from a shirred casing supply, the improvement comprising the steps of:
   a. stuffing a desired amount of the product into a length of the casing while applying a holdback force to the casing to achieve a desired stuffed pressure;
   b. constricting the encased product with closely spaced first tie and second tie gates until said gates grip the casing to close the second tie end;
   c. prior to completion of the constricting step creating slack in the casing supply so that the stuffed product displaced in constricting is forced into the slack casing;
   d. separating the first tie and second tie constricting gates while gripping the constricted casing more tightly in the second tie gate so that slippage between the casing and gates occurs at the first tie gate, whereby the desired stuffed pressure is substantially unchanged during the constricting and separating steps.

3. The method as set out in either of claims 1 or 2 wherein the step of creating slack is performed prior to the initiation of the constricting step.

4. The method as set out in either of claims 1 or 2 wherein the casing supply is controllably premoisturized prior to shirring and wherein the retarding force is applied by stretching the casing to about its desired stuffed circumference.

5. The method as set out in claim 4 in which the shirred casing supply is compressed in place on a plastic sleeve, and the step of creating slack comprises reciprocating said sleeve to release the slack casing.

6. The method as set out in claim 5 wherein the step of reciprocating includes controlling the length of the reciprocating stroke to thereby control the length of slack casing which is created.

7. In a method of stuffing flowable product, using a stuffing machine of the type compatible with a range of stuffing pressures associated with fully soaked casing, and of the type having a double clipper which constricts the stuffed product by means of a pair of gates, separates the gates, then applies a pair of clips, an improvement in said method for achieving stuffing pressures within said range with less pliable controllably premoisturized casing, said method comprising the steps of creating a holdback force during stuffing by stretching the casing to about its recommended stuffed circumference so as to stuff the casing to its recommended circumference while limiting stuffing pressures within said range, slacking the casing prior to completing the constricting phase of clipper operation so that substantially all of the product displaced during constricting is displaced into the slack casing so as not to increase pressure within the stuffed product, and gripping the second tie gates tighter than the first tie gates during the separating operation so as to prevent a pressure increase in the product during separation.

8. The method as set out in claim 7 wherein the step of slacking is performed prior to initiation of the constricting phase of clipper operation.

9. An improvement in a stuffing machine of the type compatible with a range of stuffing pressures associated with fully soaked casing, and of the type having a double clipper which constricts the stuffed product by means of a pair of gates, separates the gates, then applies a pair of clips, the improvement in said machine for achieving stuffing pressures within said range with less pliable controllably premoisturized casing, comprising in combination, sizing means for creating a holdback force during stuffing by stretching the casing to about its recommended stuffed circumference so as to stuff the casing to its recommended circumference while limiting stuffing pressures within said range, means for slacking the casing prior to completing the constricting phase of clipper operation so that substantially all of the product displaced during constricting is displaced into the slack casing so as not to increase pressure within the stuffed product, and means for gripping the second tie gates tighter than the first tie gates during the separating operation so as to prevent a pressure increase in the product during separation.

10. The improvement as set out in claim 9 wherein the means for slacking comprises a tension sleeve for carrying the casing supply and the sizing means, said tension sleeve being mounted in an operative position on the stuffing machine, and means for reciprocating the tension sleeve to create the slack casing.

11. The improvement as set out in claim 10 in which the means for reciprocating includes a linear to rotary to linear actuator.

12. The improvement as set out in either of claims 10 or 11 in which the reciprocating means includes adjustment means to set the length of the reciprocating stroke, thereby to control the length of the slack casing which is created.

13. The improvement as set out in either of claims 9 or 10 wherein the means for gripping comprises means for increasing the gripping force of the second tie gripper to a level higher than that of the first tie gripper.

14. In a clipper for a stuffing machine having a pair of gathering gates through which a stuffed product passes, each gate including an opposed pair of generally V-shaped gathering jaws which are brought together to progressively constrict the product until the junctions of the V's are juxtaposed to grip the casing and close the product, the pair of gates thereupon being adapted to separate laterally while gripping the casing to form a casing tail, the improvement comprising, a gate insert for increasing the gripping force of one gate on the casing to a higher level than that of the other gate, the insert including a pair of closely spaced end members each having a generally V-shaped edge to conform with the shape of the jaws, but having a junction at the V which is less deep than that of the jaws; means joining the end members along the V-shaped edge to form a channel between the end members open opposite the V-shaped edge, the channel being dimensioned to snugly fit one of the jaws of the gathering gate when said channel is slid thereover, and locating means to position the insert on the gate with the V-shaped edge generally conforming to the edge of the jaw, whereby the reduced depth of the V of the insert causes the gate to grip more tightly.

15. The improvement as set out in claim 14 wherein one of the end members has sufficient resilience to allow slight deflection thereof as said insert is slid over said jaw, thereby increasing the holding force of the insert on the jaw.

16. A slacker for a stuffing machine comprising in combination, a tension sleeve for carrying a casing supply and adapted to be mounted for reciprocation on the stuffing machine, attachment means for engaging the tension sleeve and for reciprocating same between two positions, a sliding block constrained for reciprocation along an axis parallel to the tension sleeve, means attaching the sliding block to the attachment means, the sliding block including a slot disposed perpendicularly to its axis of reciprocation, a rotatable member having an axis of rotation, a drive cam carried by the rotatable member, the drive cam being disposed within the slot in the sliding block, the rotatable member including means for offsetting the axis of the drive cam from the axis of rotation, and means for rapidly rotating the rotatable member about its axis and through a predetermined angle thereby to cause the drive cam to act through the sliding block and cause a reciprocation of the tension sleeve from a first to a second and back to the first position.

17. The slacker as set out in claim 16, wherein the rotatable member includes a lead screw and a block engaged therewith for translating one of said axes with respect to the other, thereby to adjust the length of the reciprocating stroke of the tension sleeve.

18. The slacker as set out in claim 16 wherein the rotatable member includes a drive pinion, a pneumatic cylinder, and a rack on the operating rod of the cylinder engaging the pinion, whereby a unidirectional stroke of the cylinder causes rotation of the rotatable member through said predetermined angle.

19. In a casing closure clipper for stuffing apparatus which includes first and second casing gathering gates through both of which product stuffed casing passes, each of said first and second casing gathering gates including a pair of juxtaposed casing gathering jaws controllably moveable between an open position wherein the product stuffed casing is unconstricted, and a closed position wherein the product stuffed casing is constricted, and includes means to controllably longitudinally separate said gates when the jaws are in said closed position to form a substantially product-free casing tail to accommodate a casing closure step, the improvement comprising, in combination:

first means as a feature on one pair of said jaws and
second means as a feature on the other pair of said jaws, said first means constructed to define a substantially complete closure constriction of said casing when its pair of jaws is in said closed position, and said second means constructed to define a less than complete closure constriction of said casing when its pair of jaws is in said closed position.

20. Apparatus according to claim 19 wherein at least one of said first means and said second means comprises a modified casing contacting surface on one of said jaws of said pair of said jaws.

21. Apparatus according to claim 20 wherein said contacting surface on said one pair of said jaws is modified to define a V-shaped aperture with an apex of lesser depth than corresponding V-shaped apertures in the others of said jaws.

22. Apparatus according to claim 20 wherein the modified casing contacting surface on one of said jaws of said pairs of jaws comprises an adapter element attached to said jaw.

23. Apparatus according to claim 22 wherein said adapter element defines a V-shaped aperture with an apex of lesser depth than corresponding V-shaped apertures on the others of said jaws.

* * * * *